3,558,529
URETHANE POLYMERS HAVING IMPROVED STIFFNESS-TEMPERATURE PROPERTIES

Robert D. Whitman, St. Albans, W. Va., and Frederick P. Reding, Stamford, Conn., assignors to Union Carbide Corporation, a corporation of New York
Filed May 3, 1967, Ser. No. 635,746
Int. Cl. C08g 22/44, 22/14
U.S. Cl. 260—2.5      4 Claims

ABSTRACT OF THE DISCLOSURE

Urethane polymers are produced from a mixture of incompatible polyols. The mixture contains at least one low molecular weight polyol having a hydroxyl number of from about 420 to about 650 and at least one high molecular weight polyol having a hydroxyl number of from about 34 to 56; the ratio of hydroxyl numbers of the polyols in the mixture being at least 10:1. The urethane polymers are useful as crash padding, insulation, etc.

---

This invention relates to urethane polymers having improved stiffness-temperature properties.

The demand for safer automobiles has resulted in an increase in the quantity of foam used as safety padding in the interiors of many cars. From the view of cost and effectiveness semi-flexible urethane foam has been found exceptionally adaptable because of its excellent cushioning properties and its ease of manufacture. However, the currently available semi-flexible urethane foams suffer from some major deficiencies. One of the more important of these is the sensitivity of the load-bearing properties of current semi-flexible foams to moderate temperature changes. A foam which is soft on a hot day and hard on a cold day will not provide consistent cushioning characteristics and is not satisfactory for use in a safety padding application since it will become too soft at the warmer summertime temperatures and too rigid at the colder wintertime temperatures. The desired urethane foam is one which shows nearly constant load-bearing properties over a wide temperature range; the urethane polymers must have stiffness properties that are relatively independent of temperature.

It has now been found that urethane polymers that possess the desired stiffness-temperature relationship over a wide range of temperatures can be produced. These urethane polymers are produced by using a mixture of incompatible polyols, i.e. a mixture of two or more polyols which does not form a homogeneous solution. The polyols can be polyester-type or polyether-type polyols, including the polyester-ether polyols; all of which are known. It was found that such incompatible mixtures generally consist of at least one low molecular weight polyol having a high hydroxyl number and at least one high molecular weight polyol having a low hydroxyl number. Any such mixture that shows physical incompatibility of the components by separation into two distinct layers or formation of an emulsion or dispersion can be used provided the ratio of hydroxyl numbers is as hereinafter defined.

Urethane polymers produced from a single polyol display a single glass transition. This, in essence, is also true of compatible solutions of two or more polyols, since it is believed the compatible polyols solution produces a single homogeneous urethane polymer, as is the fact when a single polyol is used to produce the urethane polymer.

Generally a mixture of incompatible polyols will produce a urethane polymer that has two separate and distinct glass transitions. It is believed that incompatible polyol mixtures produce incompatible urethane polymer mixtures rather than a homogeneous urethane polymer. The preferred incompatible polyol mixtures are those which produce urethane polymers that have a high temperature glass transition and a low temperature glass transition, i.e. a high temperature glass transition of at least above about 60° C. and a low temperature glass transition of at least below about −30° C. While urethane polymers produced from incompatible polyol mixtures can be produced that have low temperature glass transition above −30° C. and high temperature glass transition below 60° C., they are not as desirable; however, they can be used when ultimate properties are not required. With the preferred incompatible polyol mixtures the urethane foams produced show little change in stiffness within the temperature range encountered in common use and one is not plagued with the problem of the consumer observing a great change in the stiffness of the urethane polymer at different seasons of the year. The temperature range encountered in common use will vary upon the climatic conditions prevalent in a particular geographic area.

FIG. 1 illustrates the glass transitions of the individual polyols (curves 1 and 2) of a mixture of the same two polyols which in essence behaved as a single polyol (curve 3), and of two incompatible mixtures of the same two polyols (curves 4 and 5).

The urethane polymers used to obtain the curves shown in FIG. 1 were produced by the one-shot method using a total of 200 parts of polyol, 0.1 gram of stannous octoate catalyst and a one weight percent excess of tolylene diisocyanate. The polyols were stirred for 45 seconds, and then the stannous octoate was added and mixing was continued for an additional ten seconds. The tolylene diisocyanate was added and mixing continued for five seconds longer. Approximately 12 grams of the mixture was poured into a 5¼ inch diameter closed mold, which was then placed in a hydraulic press heated to 200° C. The mold temperature was allowed to reach 50° C. and then 2000 p.s.i. pressure was applied and maintained until the mold temperature reached 150° C. The mold was then cooled, the urethane elastomer was removed, and test specimens were die-cut from the plaque with a dumbbell-shaped cutter to provide ⅛ inch by one inch test specimens. Stiffness measurements were made at temperatures from −100° C. to +160° C. using an Instron Testing Machine (Model No. TTB) equipped with a chamber for temperature control. The measurements were made at increments of 20° C., using a crosshead speed of 0.1 inch per minute and a chart speed of 20 inches per minute. At each temperature increment, the stiffness modulus was calculated as the ratio of stress to strain at a one percent elongation based on jaw separation. A plot was then made of the stiffness versus temperature for each polymer and these stiffness-temperature curves were used to determine the glass transitions.

Curve 1 of FIG. 1 shows that the urethane polymer produced with polyol A has a glass transition of −55° C. and a stiffness modulus of from about 2,800 p.s.i. to about 3,700 p.s.i. at the temperature range of from about −20° C. to about 100° C. This stiffness is too low for load-bearing properties desired for safety padding; the foam would be too soft. Polyol A is the adduct of propylene oxide to glycerol to a hydroxyl number of about 34.

Curve 2 of FIG. 1 shows that the urethane polymer produced with polyol B has a glass transition of about 120° C. and a stiffness modulus of from about 200,000 p.s.i. to about 325,000 p.s.i. at the temperature range of from about −20° C. to about 100° C. This stiffness is too high for safety padding; the foam would be too hard. Polyol B is the propylene oxide adduct of glycerine to a hydroxyl number of about 633.

Curve 3 of FIG. 1 shows that a mixture of polyol A and polyol B at a ratio of 25:75 produced a urethane polymer that had a glass transition of about 120° C. The curve is similar to curve 2 but it shows a slight evidence of a glass transition at −60° C., which is indicative of some incompatibility. This mixture would produce a firm foam having nearly constant load-bearing properties over a wide temperature range.

Curve 4 of FIG. 1 was obtained on a urethane polymer produced from an incompatible mixture of polyol A and polyol B at a ratio of 50:50. This urethane polymer had two distinct glass transitions, a low-temperature glass transition in the vicinity of −40° C. to −60° C. and a high-temperature glass transition at about 120° C. A urethane foam produced from such a mixture would have suitable stiffness properties, or load-bearing properties, within the temperature range encountered in common use. This foam would be an ideal cushioning material and the consumer would not observe a great change in the firmness of the foam at different use temperatures.

Curve 5 of FIG. 1 shows the glass transitions of a urethane polymer produced from an incompatible mixture of polyol A and polyol B having a ratio of 65:35. This mixture produced a polymer having two very distinct glass transitions; a low-temperature glass transition at about −40° C. to about −60° C. and a high-temperature glass transition at about 100° C. A urethane foam from such an incompatible mixture would be semi-rigid and would evidence little change in load-bearing properties within the desired temperature range.

Figure 1:
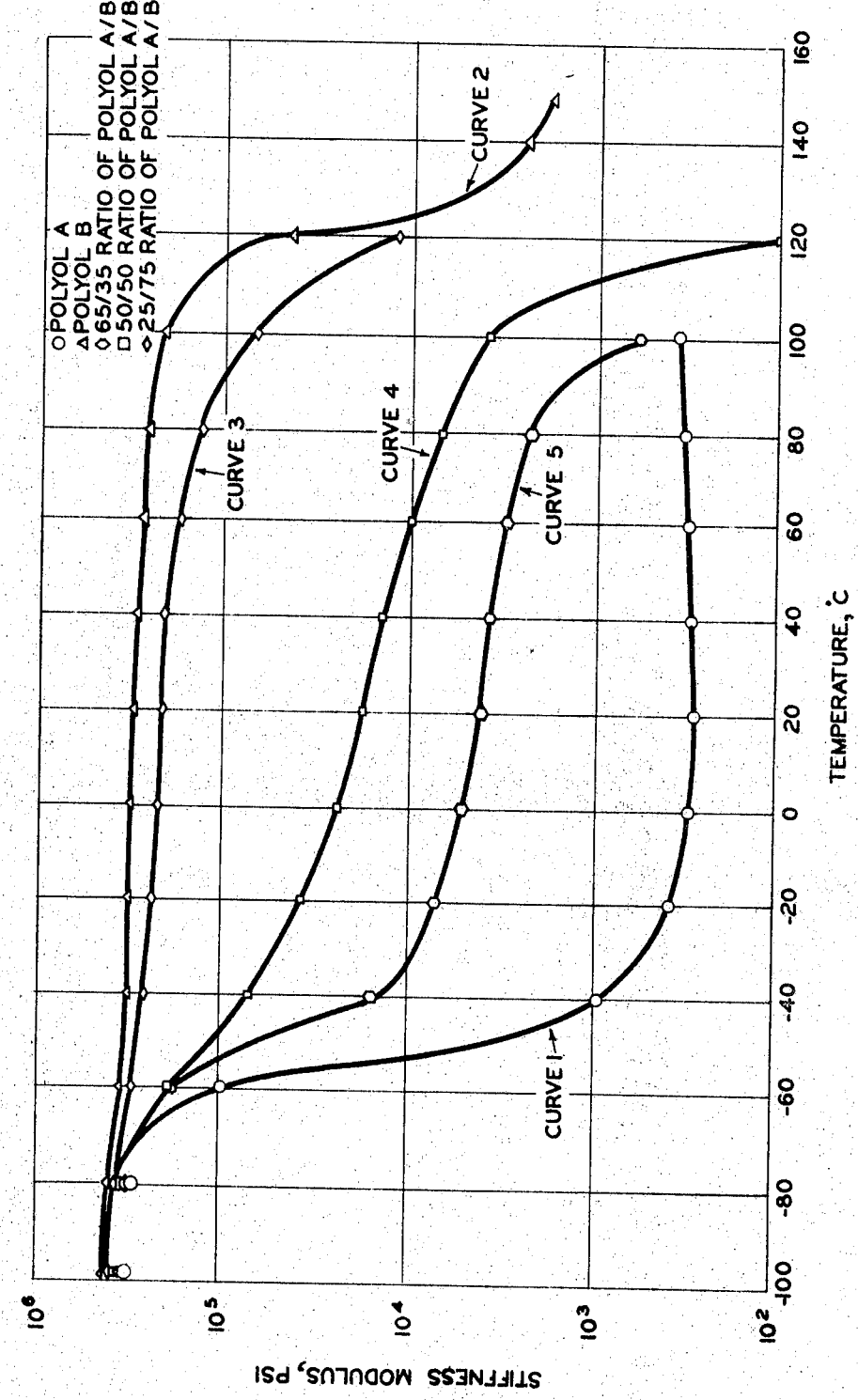

The urethane polymers produced by this invention can be elastomers or foams. The production of each type is well known in the art, the major difference being that any one of the known foaming agents, or blowing agents, is present in the reaction mixture when a foam is desired. Among the known blowing agents are water, the halocarbons such as the fluorocarbons, low boiling saturated and unsaturated hydrocarbons, and the like. The polymers can be produced by the one-shot process, the prepolymer process, or the quasi-prepolymer process.

The organic polyisocyanates that can be used include among others, 2,4- and 2,6-tolylene diisocyanates, phenylene diisocyanates, durylene diisocyanate, bis(4-isocyanatophenyl)methane, hexamethylene diisocyanate, xylylene diisocyanates, 3,10-diisocyanatotricyclo[5,2,1,0$^{2,6}$]decane, and polyisocyanates listed in the publication of Siefken, Annalen 562, pages 122–135 (1949). Other polyisocyanates of particular interest are those obtained by reacting aromatic amines with formaldehyde and phosgenation of the resulting condensation products as described in U.S. Pat. Nos. 2,683,730 and 3,012,008. The preferred organic polyisocyanates are the aromatic diisocyanates, and more preferred, the tolylene diisocyanates.

Catalysts can be present to accelerate the reaction. Among those most frequently employed in this art are the amine catalysts and the organo metallic compounds. For example, trimethylamine, N-methylmorpholine, N,N, N',N' - tetramethyl-1,3-butane-diamine, 1,4-diazabicyclo-[2.2.2]octane, dibutyltin dilaurate, stannous octoate, dioctyltin diacetate, lead octoate, lead naphthenate, lead oleate, etc. Also useful are other known catalysts such as the tertiary phosphines, the alkali and alkaline earth metal hydroxides or alkoxides, the acidic metal salts of strong acids, salts of various metals, etc. These catalysts are well known in the art and are employed in catalytic quantities, for example, from 0.001 percent to about 5 percent, based on the weight of the reaction mixture.

The use of an emulsifying agent such as the polysiloxane-polyoxyalkylene block copolymers described in U.S. Pat. 2,834,748 and 2,917,480 is also contemplated. In addition the non-hydrolyzable polysiloxane-polyoxyalkylene block copolymers wherein the polysiloxane moiety is bonded to the polyoxyalkylene moiety through direct carbon-to-silicon bonds rather than through carbon-to-oxygen-to-silicon bonds can also be used. Further, many of the other known emulsifiers can be used. These emulsifying agents are employed at concentrations of from 0.001 percent to about 5 percent by weight of the reaction mixture.

The low molecular weight polyols are those polyols that have a hydroxyl number of from about 420 to about 650 or higher. Many such polyols are known and available and include the alkylene oxide adducts of various polyhydric compounds. For example, the mono adducts, the heteric adducts, the block and graft adducts of ethylene oxide, propylene oxide, butylene oxide, etc., with one or more polyhydric starters. Illustrative thereof are the propylene oxide adducts of glycerine having hydroxyl numbers of about 420 to about 633; the propylene oxide adduct of an 80/20 mixture of sorbitol and dipropylene glycol having a hydroxyl number of about 500; the adduct of a mixture of propylene oxide and ethylene oxide with glycerine to a hydroxyl number of about 420 to 633 or higher; the propylene oxide adduct of sucrose having a hydroxyl number of about 450; the adduct of a mixture of propylene oxide and butylene oxide with ethylene glycol to a hydroxyl number of about 450 or higher; the ethylene oxide adduct of glycerine to a hydroxyl number of about 628; the adduct of about six moles of ethylene oxide and one mole of sucrose, the adduct of about 3 to 6 moles of propylene oxide with one mole of trimethylolpropane; the adducts of about 3 moles of ethylene oxide or propylene oxide with one mole of 1,2,6-hexanetriol; and the like. Additional polyhydric compounds that can be used as starters in the reaction with alkylene oxides include pentaerythritol, castor oil, sorbitol, sucrose, alphamethyl glucoside, diethylene glycol, dipropylene glycol, butanediol, pentanediol, hexanediol, triphenylolpropane (phenol formaldehyde condensation products), and the like. Many more are known in the art and are obvious to the average skilled scientist in this field. The critical feature of the low molecular weight polyols is that the hydroxyl number be as previously defined, at least about 420.

The high molecular weight polyols have hydroxyl numbers of from about 56 to about 34, or lower. Many such polyols are known and available and include the alkylene oxide adducts of various polyhydric compounds. The polyols include the adducts of the alkylene oxides containing from 2 to about 4 or more carbon atoms with one or more polyhydric starters as defined above. These adducts can be the mono adducts, i.e. produced with a single alkylene oxide, or the heteric, block or graft adducts; all of these are known in the art, as are the methods for their production. Illustrative high molecular weight polyols include the propylene oxide adducts of glycerine having hydroxyl numbers of 28, 34, 42 and 56; the propylene oxide adducts of 1,2,6-hexanetriol having hydroxyl numbers of 28, 34, 42 and 56; the propylene oxide adducts of dipropylene glycol having hydroxyl numbers of 28 and 37; the heteric mixed oxide adducts of a mixture of propylene oxide and ethylene oxide with glycerine to a hydroxyl number of about 45; the capped polyols of the adduct of propylene oxide with glycerine capped by ethylene oxide having a hydroxyl number of about 56 or lower; the ethylene oxide adducts of glycerine to hydroxyl numbers of about 56 to 28 and lower; and the like. The high molecular weight polyols are known in the art; the critical feature for the purpose of this invention is that they have the previously defined hydroxyl numbers below about 56.

The selection of the two different polyols is made to give a mixture which is not compatible; i.e. a mixture which will separate into two distinct layers or which will form an emulsion or dispersion. The proportions of high molecular weight polyol to low molecular weight polyol can vary from about 90:10 to about 25:75, preferably from about 70:30 to about 45:55; the ratio will depend to some extent upon the components themselves. It is generally preferred to have a major amount of the high molecular weight polyol in the incompatible mixture, i.e. a ratio of greater than 50:50.

The ratio of the hydroxyl number of the low molecular weight polyol to the hydroxyl number of the high molecular weight polyol should be above 10:1, preferably above about 12:1, and most preferably about 15:1 or higher.

The following examples further serve to illustrate the invention.

EXAMPLE 1

A urethane polymer was prepared by compression molding a mixture of 130 grams of the adduct of glycerine with propylene oxide to a hydroxyl number of 34, 70 grams of the adduct of propylene oxide with glycerine to a hydroxyl number of 633, 1 gram of the 80/20 ethylene oxide/propylene oxide block copolymer having a molecular weight of 8750 as emulsifier, 0.2 gram of a mineral spirits solution of lead octoate containing 24% lead, and 76 grams of an 80/20 mixture of 2,4- and 2,6-tolylene diisocyanate. The ratio of the hydroxyl numbers of the two polyols was 18.6:1.

Prior to polymer preparation the two polyols were emulsified by adding the emulsifier to a physical mixture of the polyols; the polyol mixture was stirred vigorously while adding the emulsifier. The polyol emulsion (201 grams) was then weighed into a one-quart container and stirred for 45 seconds with a 2-inch diameter turbine driven at 1,000 r.p.m. by an air motor. After the initial 45 seconds of mixing the lead octoate solution was added to the container and mixing continued for 10 seconds. Then the tolylene diisocyanate was added and mixing was continued for 5 seconds longer. Approximately 12 grams of the mixture was poured into a 5¼-inch diameter closed mold and this mold was placed in a hydraulic press heated to 200° C. The mold was allowed to heat to 50° C. and 2,000 p.s.i. pressure was applied. After the mold temperature reached 150° C. the mold was cooled immediately and the polymer sample was removed.

Figure 2:
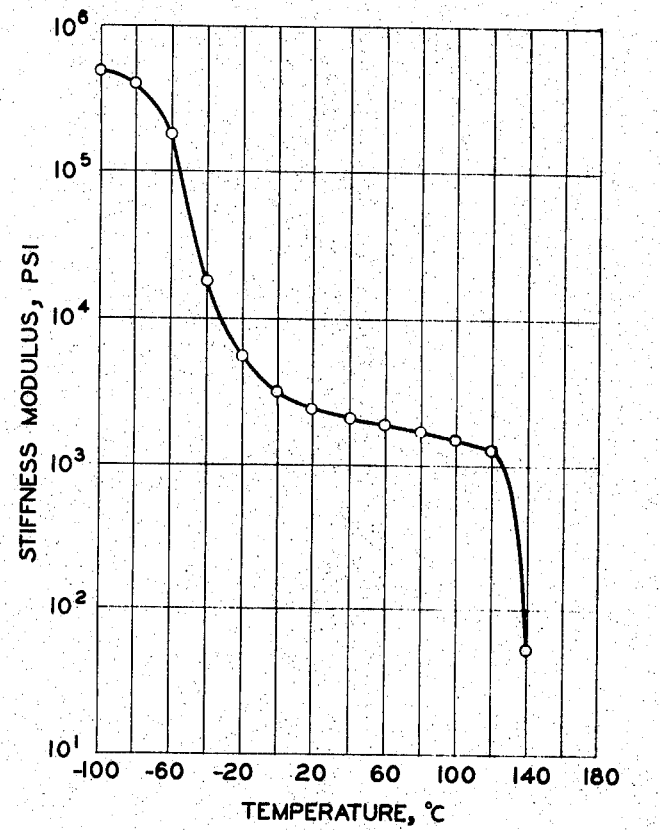
FIG. 2 represents the curve of stiffness modulus vs. temperature for the urethane polymer of Example 1.

A specimen ⅛-inch in width by about 3 inches in length was die-cut from the polymer sample and the stiffness moduli (stress/strain at 1% elongation) properties were measured at various temperatures using an Instron Tensile Tester, Model TTB, equipped with a temperature-control enclosure. The stiffness-temperature responses for this polymer (FIG. 2) show two distinct glass transitions with one at −50° C. and the other at 130° C.

EXAMPLE 2

A urethane foam was prepared with 381 grams of the adduct of glycerine with propylene oxide to a hydroxyl number of 34, 205 grams of the adduct of glycerine with propylene oxide to a hydroxyl number of 633, 5.9 grams of water, 5.9 grams of the polysiloxane-polyoxyalkylene block copolymer having a molecular weight of about 6650, 2.9 grams of the 80/20 ethylene oxide/propylene oxide block copolymer having a molecular weight of about 8750, 0.6 gram of a 24 percent lead octoate solution, 1.2 grams of a 33 percent solution of triethylenediamine and 34.5 grams of tolylene diisocyanate by metering these components simultaneously to a Martin Sweets foam machine mixing head (Model VBD–301). The Martin Sweets Mixer speed was 4500 r.p.m. The ratio of the hydroxyl numbers of the two polyols was 18.6:1.

Figure 3:
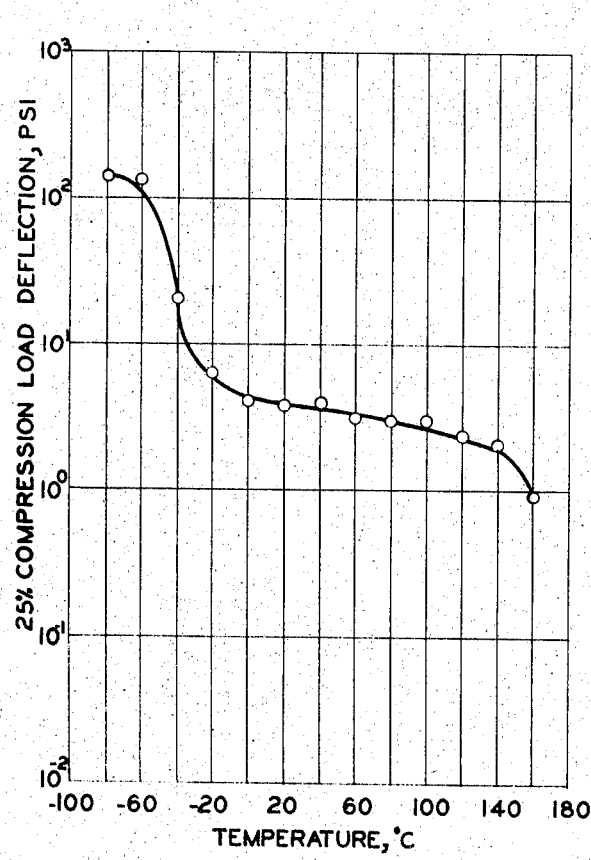
FIG. 3 represents the curve of 25% compression load deflection vs. temperature for the urethane foam of Example 2.

The mixed ingredients were poured into a paperboard box 14 inches in length by 7 inches in width by 6 inches in height where the foam was generated. The cream and rise times for this foam sample were 21 and 51 seconds respectively. Specimens 2 inches in length by 2 inches in width by 1 inch in thickness were die-cut from the foam sample after overnight curing at room temperature, and the compression load deflection properties of these specimens were measured at various temperatures using an Instron Tensile Tester, Model TTB, equipped with a compression cell and a temperature chamber. The compression load deflection values at 25% deflection plotted against temperature (FIG. 3) show that there are two distinct glass transitions in the foam similar to those observed in the molded urethane polymer of Example 1. The molded polymer had glass transitions at −50° C. and 130° C. whereas the foam glass transitions appear at about −40° C. and 160° C. Since the foam exhibits glass transitions that are well displaced from nominal room temperature its load-bearing properties are relatively insensitive to temperature in the use temperature range.

EXAMPLE 3

A urethane polymer was prepared by compression molding a mixture of 130 grams of the adduct of propylene oxide with glycerine to a hydroxyl number of 34, 70 grams of the adduct of propylene oxide to glycerine to a hydroxyl number of 633, 0.1 gram of stannous octoate, and 117.4 grams of polymethylene polyphenylisocyanate having an average functionality of about 3.1. The ratio of the hydroxyl numbers of the two polyols was 18.6:1. The two polyols were weighed into a one-liter stainless steel beaker and stirred 45 seconds with a 2-inch diameter turbine driven at 1,000 r.p.m. by an air motor. The stannous octoate was added and mixing continued for 10 seconds. Then the isocyanate was added and mixing was continued for 5 seconds longer. Approximately 12 grams of the mixture was poured into a 5¼-inch diameter closed mold and this mold was placed in a hydraulic press heated to 200° C. The mold was allowed to heat to 50° C. and 2,000 p.s.i. pressure was applied. After the mold temperature reached 150° C. the mold was cooled immediately and the polymer sample was removed for evaluation.

Figure 4:
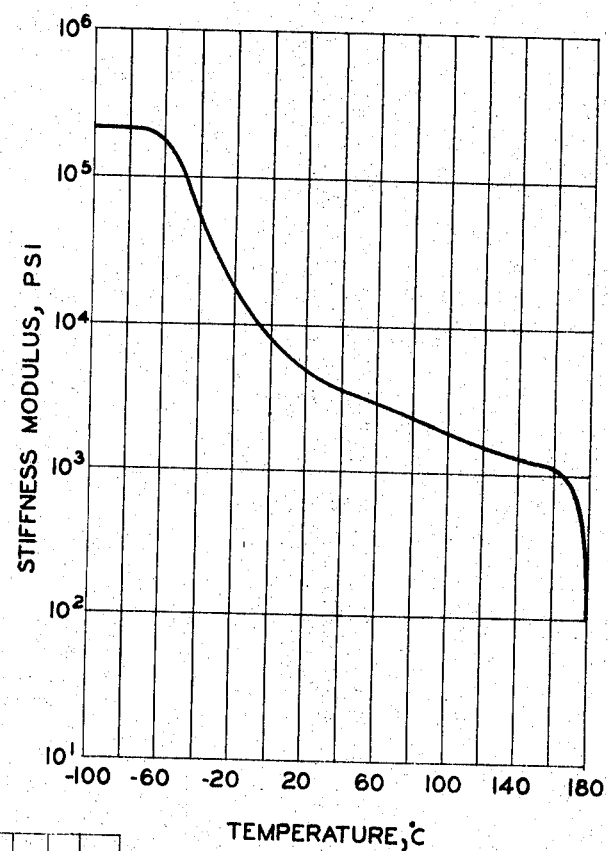
FIG. 4 represents the curve of stiffness modulus vs. temperature for the urethane polymer of Example 3.

A test specimen ⅛-inch in width by 3 inches in length was die-cut from the polymer sample and the stiffness moduli (stress/strain at 1% elongation) properties were measured at various temperatures. These measurements were made with an Instron Tensile Tester, Model TTB, equipped with a temperature-control enclosure. The stiffness-temperature curve (FIG. 4) shows that the polymer has two distinct glass transitions occurring at −40° C. and around 180° C. Since these glass transitions are well displaced from room temperature the polymer properties are fairly insensitive to temperature in the use temperature range.

EXAMPLE 4

A one-shot foam was prepared with 390 grams of the adduct of propylene oxide to glycerine to a hydroxyl number of about 34, 210 grams of the adduct of propylene oxide glycerine to a hydroxyl number of about 633, 6 grams of water, 1.2 grams of a 33 percent solution of triethylenediamine, 0.6 gram of stannous octoate, 6 grams of polydimethylisiloxane, and 52 grams of an 80/20 mixture of 2,4- and 2,6-tolylene diisocyanate. The ratio of hydroxyl numbers of the polyols was 18.6:1. These ingredients were mixed in a one-half gallon container with a 2½-inch diameter 6-bladed turbine running at 3,000 r.p.m. The reaction mixture was poured into a paperboard box 14 inches in length by 4 inches in width by 6 inches in height where the foam was generated. The foam was allowed to cure at room temperature overnight before performing any tests.

Figure 5:
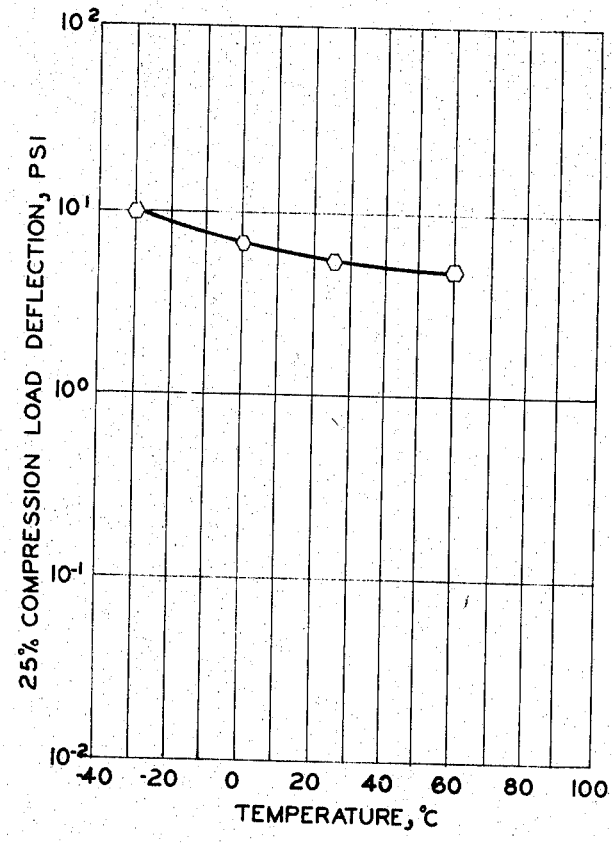
FIG. 5 represents the curve of 25% compression load deflection vs. temperature for the urethane foam of Example 4.

Test specimens 2 inches in length by 2 inches in width by 1 inch in thickness were used to determine compression load deflection properties at various temperatures. An Instron Tensile Tester (Model TTB) equipped with a compression cell and a temperature control chamber was used to perform these tests. A plot of compression load deflection values at 25% deflection vs. temperature (FIG. 5) reveals that the foam load-bearing properties are relatively insensitive to temperature in the range of −30° C. to +60° C. The foam showed no glass transition between these points.

EXAMPLE 5

A one-shot foam was prepared with 390 grams of the adduct of propylene oxide to glycerine to a hydroxyl number of about 34, 210 grams of the adduct of propylene oxide to glycerine to a hydroxyl number of about 633, 3 grams of an 80/20 ethylene oxide/propylene oxide block copolymer having a molecular weight of about 8750 as emulsifier, 6.0 grams of water, 1.2 grams of a 33 percent solution of triethylenediamine, 0.6 gram of stannous octoate, 6 grams of polydimethylsiloxane having a viscosity of 350 centistokes at 25° C., and 52 grams of an 80/20 mixture of 2,4- and 2,6-tolylene diisocyanate. The two polyols were emulsified with the emulsifier prior to foam manufacture. In foam preparation the ingredients were mixed in a one-half gallon container with a 2½-inch diameter 6-bladed turbine running at 3,000 r.p.m. After mixing the reactant were poured into a paperboard box 14 inches in length by 14 inches in width by 6 inches in height where the foam was generated. The foam sample was allowed to cure overnight at room temperature before performing any tests.

Figure 6:
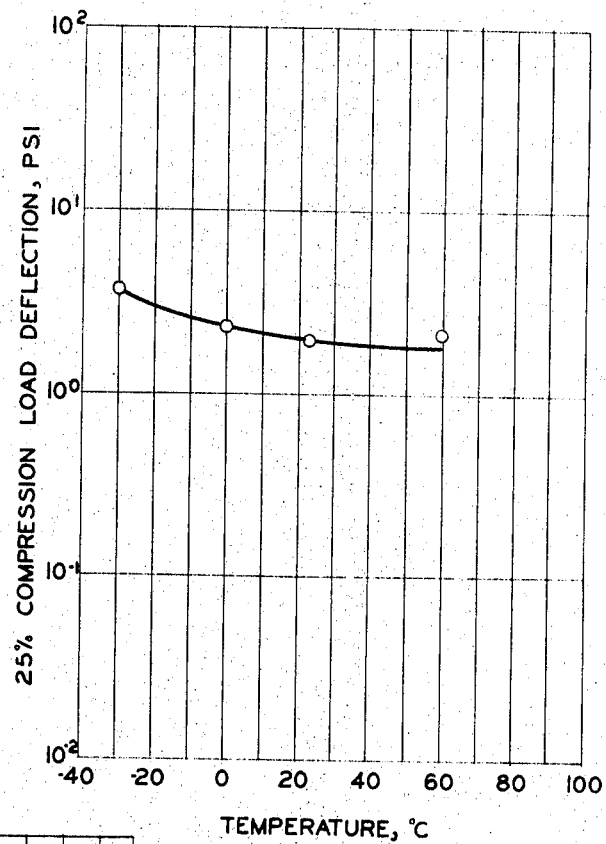
FIG. 6 represents the curve of 25% compression load deflection vs. temperature for the urethane foam of Example 5.

Test specimens 2 inches in length by 2 inches in width by 1 inch in thickness were die-cut from the foam sample for compression load deflection tests at various temperatures. An Instron Tensile Tester (Model TTB) equipped with a compression cell and a temperature control chamber was used to perform these tests. A plot of compression load deflection values at 25% deflection vs. temperature (FIG. 6) shows that this foam has load-bearing properties relatively insensitive to temperature similar to the results obtained in Example 4; there was no evidence of a glass transition between −30° C. and 60° C., indicating that the glass transitions were beyond these values.

EXAMPLE 6

A quasi-prepolymer technique was used in the preparation of a foam based on 390 grams of the adduct of propylene oxide to glycerine to a hydroxyl number of about 34, 210 grams of the adduct of propylene oxide to glycerine to a hydroxyl number of 633, 6 grams of water, 1.2 grams of a 33 percent solution of triethylenediamine, 0.6 gram of stannous octoate, 6 grams of the polydimethylsiloxane and 52 grams of tolylene diisocyanate. Prior to foam preparation the 390 grams of polyol of 34 hydroxyl number was reacted with the 52 grams of an 80/20 mixture of 2,4- and 2,6-tolylene diisocyanate and the reaction was completed by heating the mixture at 90° C. for 1 hour. This prepolymer (442 grams) and the other ingredients were mixed in a one-half gallon container for the preparation of a foam sample. These ingredients were mixed with 2½-inch diameter 6-bladed turbine running at 2,200 r.p.m. and, after mixing, the ingredients were poured into a paperboard box 14 inches in length by 14 inches in width by 6 inches in height where the foam was generated. The foam sample was allowed to cure overnight at room temperature before testing.

Figure 7:
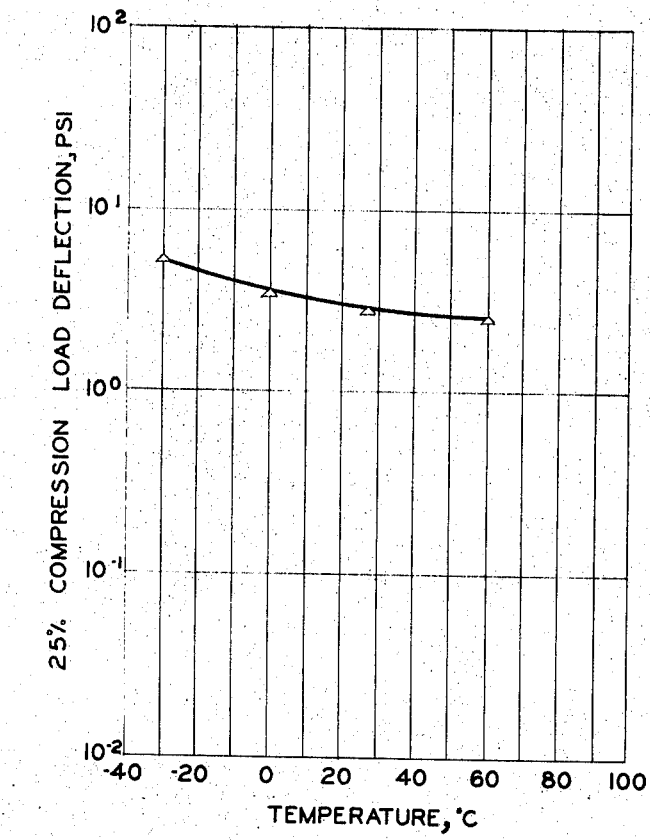
FIG. 7 represents the curve of 25% compression load deflection vs. temperature for the urethane foam of Example 6.

Test specimens 2 inches in length by 2 inches in width by 1 inch in thickness were die-cut from the foam sample for compression load deflection measurements at various temperatures. These tests were made with an Instron Tensile Tester (Model TTB) equipped with a compression cell and a temperature control chamber. Compression load deflection values measured at 25% deflection were then plotted against temperature (FIG. 7). Thus curve shows that the foam load-bearing properties are fairly insensitive to temperature similar to the foam samples described in Examples 4 and 5. There was no evident of a glass transition within the range of −30° C. to 60° C.

What is claimed is:

1. A urethane polymer having a low temperature glass transition at least below about −30°C. and a high temperature glass transition at least above about 60° C., said urethane polymer comprising the reaction product of (a) an organic polyisocyanate and (b) a mixture of a low molecular weight polyether polyol having a hydroxyl number of from about 420 to about 650 and a high molecular weight polyether polyol having a hydroxyl number of from about 34 to about 56; said polyols being present in a weight ratio of high molecular weight to low molecular weight of from about 90:10 to about 25:75 said polyols having a ratio of the hydroxyl number of the low molecular weight polyol to the hydroxyl number of the high molecular weight polyol of at least 15:1; and said polyols being mutually incompatible.

2. A urethane polymer as claimed in claim 1 wherein the ratio of high molecular weight polyol to low molecular weight polyol in the incompatible polyol mixture is from about 70:30 to about 45:55.

3. A urethane polymer as claimed in claim 1 wherein the incompatible polyol mixture is a 65:35 mixture, the adduct of propylene oxide to glycerol to a hydroxyl number of about 34 as the high molecular weight polyol and tris(hydroxypropoxy) propane of a hydroxyl number of 633 as the low molecular weight polyol; the ratio of hydroxyl numbers being about 18.6:1.

4. A urethane polymer as claimed in claim 1 wherein the polymer is in the form of a flexible or semi-flexible foam and wherein each polyether polyol is the adduct of (1) an alkylene oxide contains from 2 to 4 carbon atoms inclusive and (2) sorbitol, glycerine, sucrose, ethylene glycol, glycerine, sucrose, trimethylolpropane, 1,2,6-hexanetriol, pentaerythritol, castor oil, sorbitol, sucrose, alpha-methyl glucoside, diethylene glycol, dipropylene glycol, butanediol, pentanediol, hexanediol, or triphenylolpropane.

References Cited

UNITED STATES PATENTS

| 3,072,582 | 1/1963 | Frost | 260—2.5 |
| 3,288,732 | 11/1966 | Chapman et al. | 260—2.5 |
| 3,489,698 | 1/1970 | Morehouse | 260—9 |

OTHER REFERENCES

Saunders et al.: Polyurethanes, Part I, Interscience, New York (1962), pp. 43–44.

Hackh's Chemical Dictionary, Third Edition, McGraw-Hill, New York (1944) pp. 217 and 433.

DONALD E. CZAJA, Primary Examiner

H. S. COCKERAM, Assistant Examiner

U.S. Cl. X.R.

260—18, 77.5